United States Patent

Buch

[11] Patent Number: 5,964,481
[45] Date of Patent: Oct. 12, 1999

[54] MODULAR MOUNTING APPARATUS FOR FLUID CONTROL COMPONENTS

[76] Inventor: Dana Buch, 48521 Warm Springs Blvd., Fremont, Calif. 94539

[21] Appl. No.: 09/113,000

[22] Filed: Jul. 10, 1998

[51] Int. Cl.$^6$ .................................................. F16L 35/00
[52] U.S. Cl. ............................ 285/18; 285/61; 285/125.1
[58] Field of Search ........................... 285/18, 61, 125.1, 285/FOR 132; 137/596, 798, 833, 884

[56] References Cited

U.S. PATENT DOCUMENTS

| | | | |
|---|---|---|---|
| 3,195,572 | 7/1965 | Carls | 285/125.1 |
| 3,219,053 | 11/1965 | Hupp | 285/125 X |
| 3,934,605 | 1/1976 | Legris | 285/125.1 |
| 4,062,569 | 12/1977 | Kay | 285/125.1 X |

*Primary Examiner*—Dave W. Arola
*Attorney, Agent, or Firm*—Flehr Hohbach Test Albritton & Herbert LLP

[57] ABSTRACT

A mounting apparatus for fluid control components includes a first mounting plate with a first serial connection major surface with a first fluid port, a first set of through holes, and a first set of threaded holes formed therein, a first linking major surface, a first component minor surface with first component affixation apertures formed therein, and a first substrate minor surface with first substrate affixation apertures formed therein. A second mounting plate is aligned in a parallel configuration with the first mounting plate. The second mounting plate includes a second serial connection major surface with a second fluid port, a second set of through holes, and a second set of threaded holes formed therein, a second linking major surface, a second component minor surface with second component affixation apertures formed therein, and a second substrate minor surface with second substrate affixation apertures formed therein. A linking plate is attached to a portion of the first linking major surface and a portion of the second major linking surface, such that the linking plate is in a perpendicular configuration with respect to the first mounting plate and the second mounting plate.

12 Claims, 6 Drawing Sheets

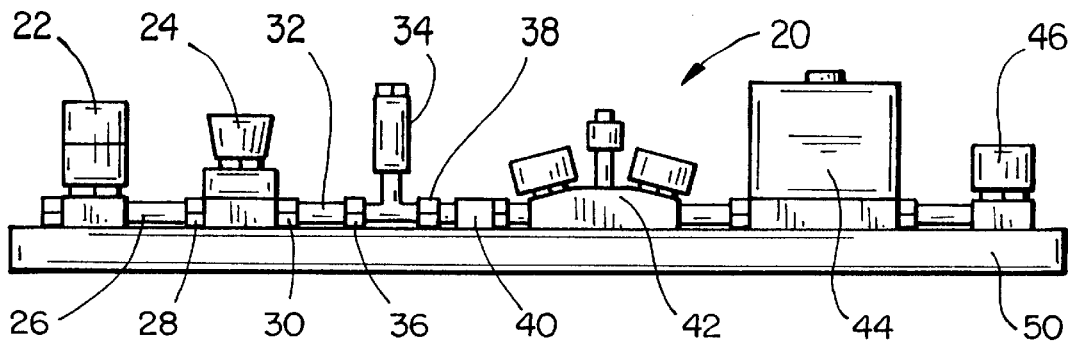
FIG_1
(PRIOR ART)
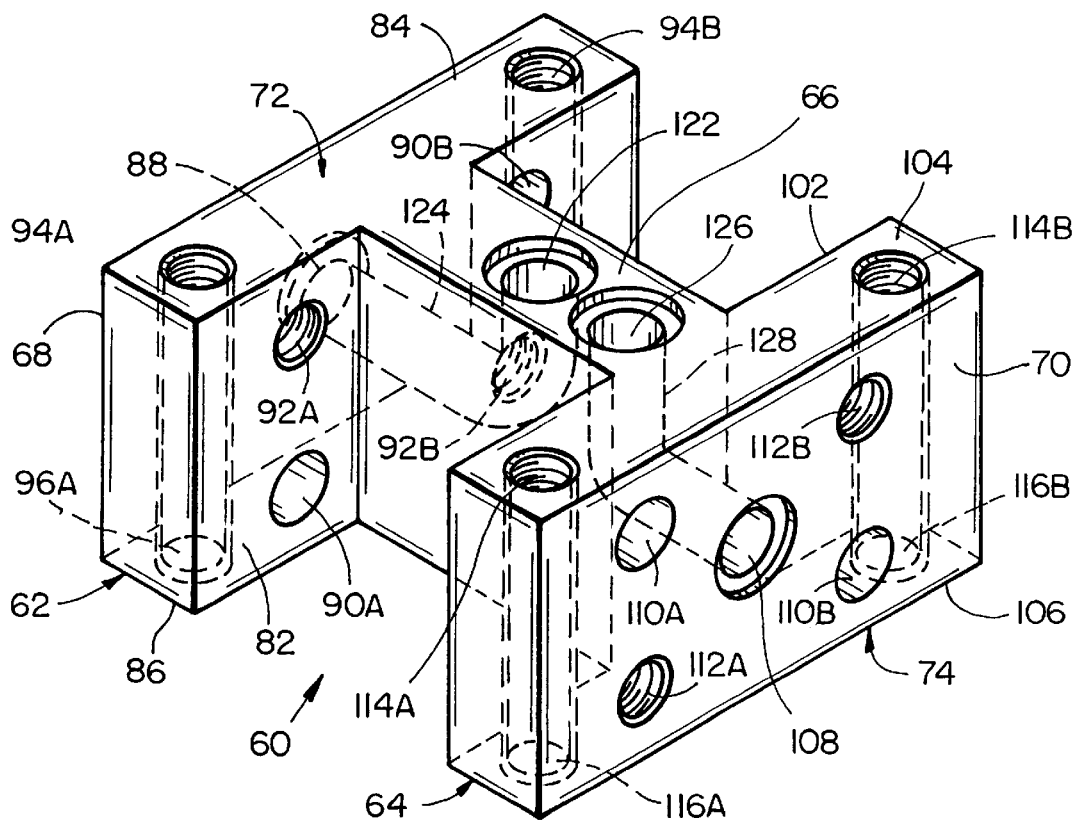
FIG_2

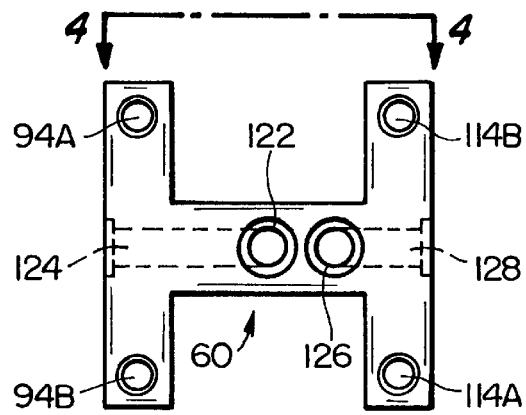
FIG_3
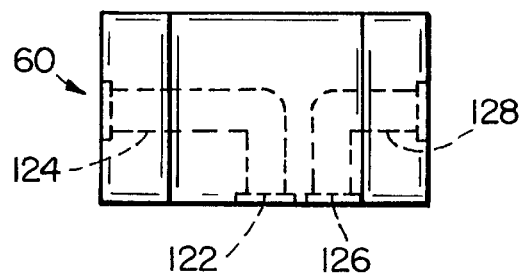
FIG_4
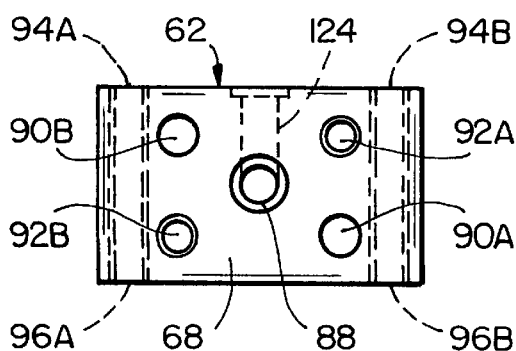
FIG_5
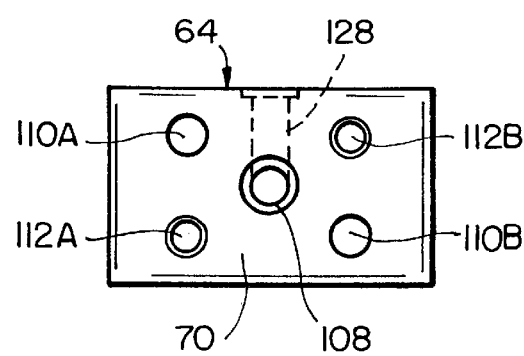
FIG_6

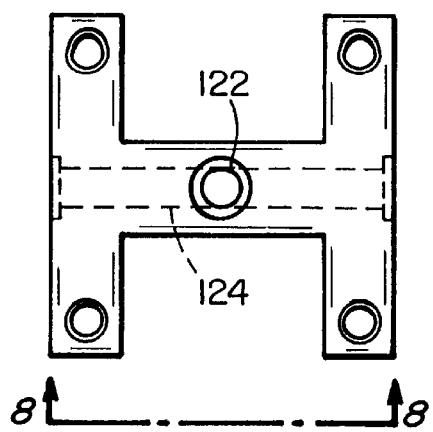
FIG_7
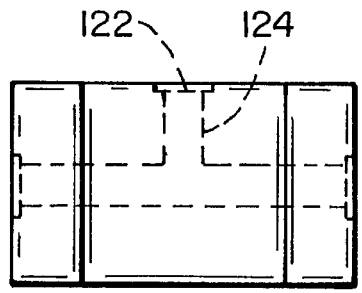
FIG_8
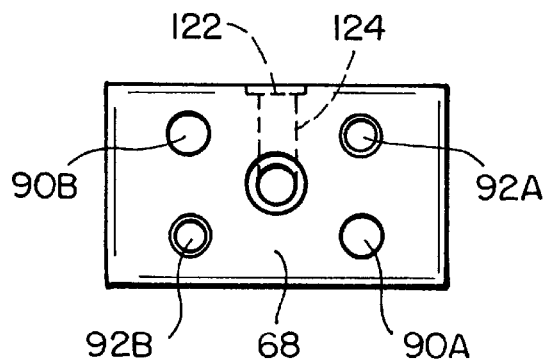
FIG_9
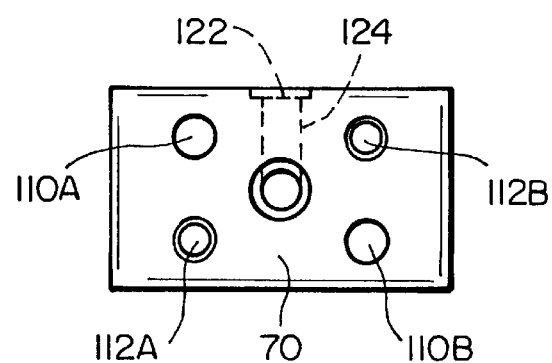
FIG_10

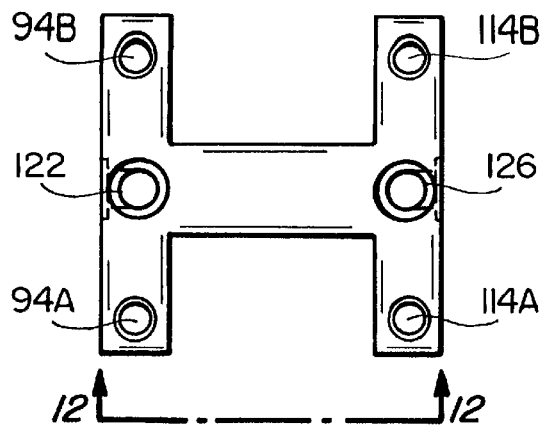
FIG_11
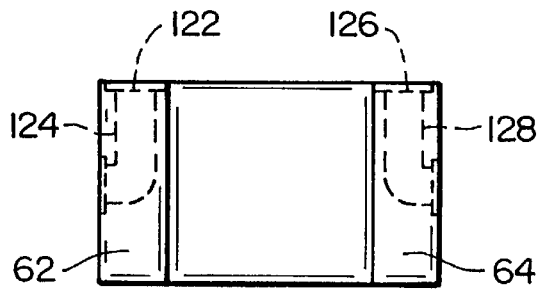
FIG_12
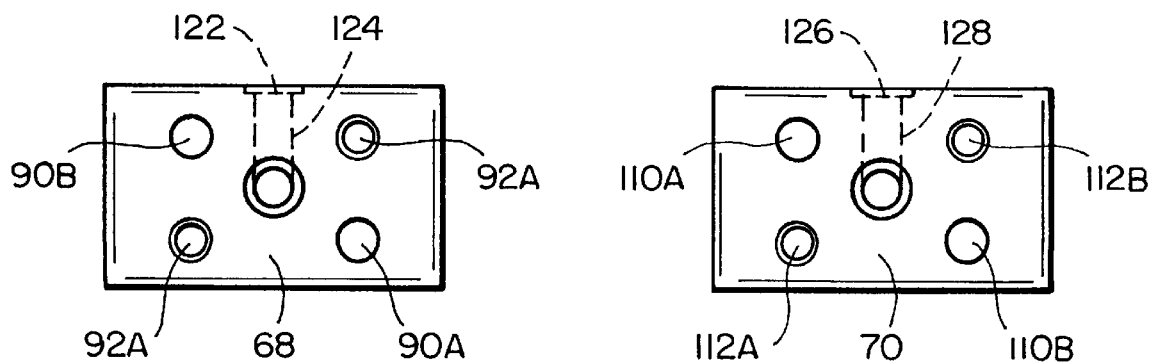
FIG_13          FIG_14

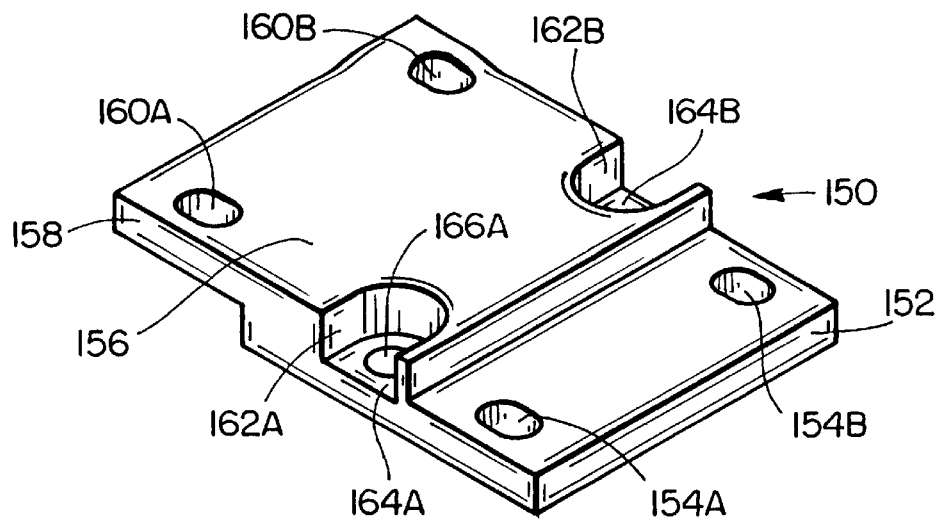
FIG_15
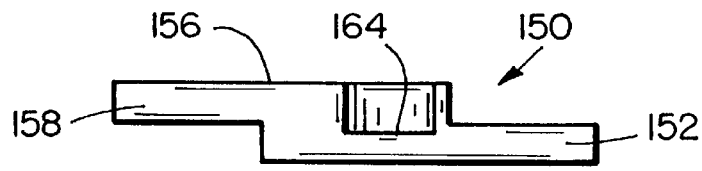
FIG_16
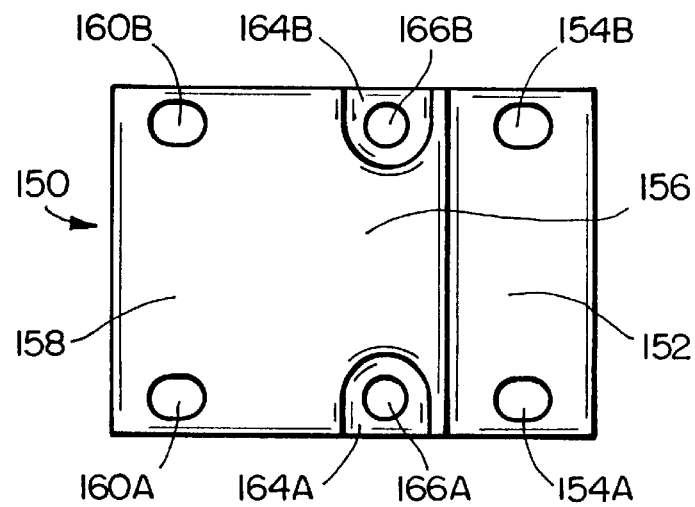
FIG_17

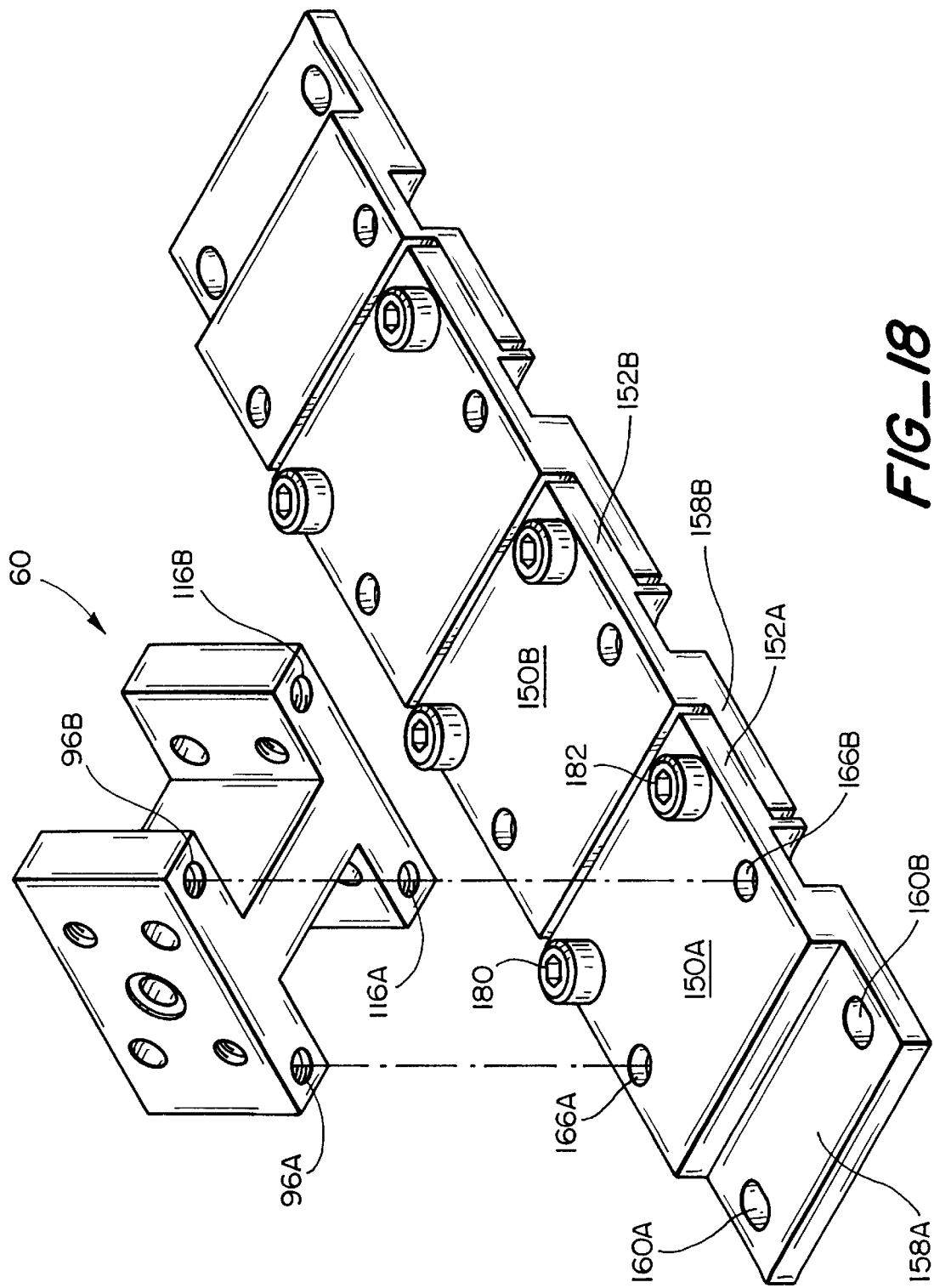

MODULAR MOUNTING APPARATUS FOR FLUID CONTROL COMPONENTS

BRIEF DESCRIPTION OF THE INVENTION

This invention relates generally to fluid control systems. More particularly, this invention relates to a modular mounting system for fluid control components of a fluid control system.

BACKGROUND OF THE INVENTION

Fluid control components are used to control the delivery of a fluid (i.e., a gas or liquid) in industrial processes. For example, in semiconductor processing equipment, a variety of fluid control components are configured in a "gas stick", which precisely controls the delivery of various fluids during semiconductor processing.

FIG. 1 illustrates a prior art gas stick 20. The gas stick 20 includes a set of fluid control components joined by multiple welds and fittings. One fluid control component depicted in FIG. 1 is a shut-off valve 22. A pipe section 26 links the shut-off valve 22 to a sleeve or fitting 28 associated with a manual pressure regulator 24. The manual pressure regulator 24 has a fitting 30 on its opposite side for connection with a pipe section 32. Pipe section 32 is connected to a fitting 36 associated with a pressure transducer 34. The opposite side of the pressure transducer 34 also has a fitting 38 for connection with another pipe section. The remaining components in the figure are similarly configured with fittings for attachments to pipe sections. By way of example, the remaining fluid control components in FIG. 1 include a shut-off valve/purge device 42, a mass flow controller 44, and a shut-off valve 46. The gas stick 20 is attached to a substrate 50. Other gas sticks (not shown) may also be attached to the substrate to form a gas panel.

Those skilled in the art recognize a number of problems associated with prior art gas sticks of the type illustrated in FIG. 1. First, the multiple fittings and pipe sections need to be welded or otherwise secured to one another. The assembly of these components can be relatively labor intensive. Similarly, the disassembly of these components for repair or replacement can be extremely labor intensive.

Another problem associated with the gas stick 20 is that the numerous fittings and pipe sections produce a relatively long and heavy device. The attachment of the gas stick 20 to a substrate 50 also produces problems since the entire gas stick 20 must be removed from the substrate 50 in order to effectuate a repair of the gas stick 20.

Efforts to alleviate these problems have resulted in the use of square blocks on which fluid control components are mounted. A fluid control component is mounted on each block and the blocks are attached in a serial manner. Each square block typically has a set of threaded holes on one side of the block and a set of through holes on an opposite side of the block. The threaded holes and the through holes allow the block to be unidirectionally positioned with respect to a similarly configured block. The unidirectional nature of the connection means that an input port associated with a block cannot be used as an output port and vice versa.

Existing square mounting blocks are relatively heavy. In addition, the configuration of threaded holes and through holes dictate that the blocks be used in a unidirectional manner. Another problem with existing square mounting blocks is that they are not easily attached to a substrate. Furthermore, their configuration precludes or limits access to individual fluid control components which need to be repaired or replaced. It would be highly desirable to improve access to individual fluid control components so that such components could be repaired or replaced without disassembly of an entire gas stick.

SUMMARY OF THE INVENTION

A mounting apparatus for fluid control components includes a first mounting plate with a first serial connection major surface with a first fluid port, a first set of through holes, and a first set of threaded holes formed therein, a first linking major surface, a first component minor surface with first component affixation apertures formed therein, and a first substrate minor surface with first substrate affixation apertures formed therein. A second mounting plate is aligned in a parallel configuration with the first mounting plate. The second mounting plate includes a second serial connection major surface with a second fluid port, a second set of through holes, and a second set of threaded holes formed therein, a second linking major surface, a second component minor surface with second component affixation apertures formed therein, and a second substrate minor surface with second substrate affixation apertures formed therein. A linking plate is attached to a portion of the first linking major surface and a portion of the second major linking surface, such that the linking plate is in a perpendicular configuration with respect to the first mounting plate and the second mounting plate.

A fluid control component is attached to the component minor surface. The mounting apparatus is attached to a substrate via the substrate minor surface. The serial connection major surfaces are used to establish connections with adjacent devices. Alignment between through holes on the first mounting plate and threaded holes on the second mounting plate, and threaded holes on the first mounting plate and through holes on the second mounting plate allow the mounting apparatus to be bidirectionally configured such that an input port can serve as an output port and vice versa. Fluid channels are formed in the apparatus to accommodate various fluid control components.

The mounting apparatus may be used in combination with a first substrate mount. The first substrate mount includes a base surface with base surface through holes defined therein. A plateau surface is on top of a portion of the base surface and extends past the base surface to form a ledge region. The ledge region includes ledge region through holes. The plateau includes plateau valleys with valley floors with valley floor apertures positioned therein. A second substrate mount with a configuration identical to the first substrate mount may be used to link the first substrate mount. In this case, the base surface of the second substrate mount is aligned with the ledge region of the first substrate mount.

The H-shape defined by the first mounting plate, the second mounting plate, and the linking plate provides a number of advantages. First, the mounting apparatus is relatively light, compared to a solid block structure. The H-shape also allows less material to be used so the device is relatively cost effective. The arrangement of the threaded holes and through holes of the mounting plates allows for bi-directional configuration of each mounting apparatus, unlike prior art unidirection mounting blocks. The relatively close proximity of the threaded holes to one another allows seals to be established with the use of only two bolts, instead of the four perimeter bolts that are used in prior art block devices. The open shape of the mounting apparatus allows easy access to the substrate so that individual fluid control components can be replaced without dismantling an entire gas stick. Advantageously, the channels formed in the mounting apparatus are parallel or perpendicular to the surface upon which they terminate. Consequently, all machining is done at 90 degree angles, instead of the random angles that may be required with prior art devices.

The substrate mounts of the invention provide an intermediate substrate which facilitates modular repairs of individual fluid control components and seals. In addition, the mounting plates add considerable torsional rigidity to improve the integrity of the connecting seals.

BRIEF DESCRIPTION OF THE DRAWINGS

For a better understanding of the invention, reference should be made to the following detailed description taken in conjunction with the accompanying drawings, in which:

FIG. 1 is a side view of a prior art gas stick.

FIG. 2 is a perspective view of a fluid component mounting apparatus in accordance with an embodiment of the invention.

FIG. 3 is a top view of the apparatus of FIG. 2.

FIG. 4 is a view of the apparatus of FIG. 3 taken along the line 4—4.

FIG. 5 is a first end view of the apparatus of FIG. 1.

FIG. 6 is a second end view of the apparatus of FIG. 1.

FIG. 7 is a top view of an alternate embodiment of a fluid component mounting apparatus in accordance with an embodiment of the invention.

FIG. 8 is a side view of the fluid component mounting apparatus of FIG. 7 taken along the line 8—8.

FIG. 9 is a first end view of the apparatus of FIG. 7.

FIG. 10 is a second end view of the apparatus of FIG. 7.

FIG. 11 is a top view of an alternate embodiment of a fluid component mounting apparatus in accordance with another embodiment of the invention.

FIG. 12 is aside view of the fluid component mounting apparatus of FIG. 11 taken along the line 11–11.

FIG. 13 is a first end view of the apparatus of FIG. 11.

FIG. 14 is a second end view of the apparatus of FIG. 11.

FIG. 15 is a perspective view of a substrate mount in accordance with an embodiment of the invention.

FIG. 16 is a side view of the apparatus of FIG. 15.

FIG. 17 is a top view of the apparatus of FIG. 15.

FIG. 18 is a perspective, exploded view of a mounting block and linked substrate mounts of the invention.

Like reference numerals refer to corresponding parts throughout the drawings.

DETAILED DESCRIPTION OF THE INVENTION

FIG. 2 is a perspective view of a modular mounting apparatus 60 for fluid control components in accordance with an embodiment of the invention. The apparatus 60 includes three major components: a first mounting plate 62, a second mounting plate 64, and a linking plate 66. The first mounting plate 62 and the second mounting plate 64 are in a parallel configuration. The linking plate 66 is perpendicular to the first mounting plate 62 and the second mounting plate 64, the device 60 thereby forming an "H". While the device 60 is described as having three components, in a preferable embodiment the components are unitary. That is, they are preferably formed of a single material, although they may be individually formed and later attached to one another.

The mounting device 60 has a first serial connection major surface 68 and a second serial connection major surface 70. These surfaces are used to establish serial connection with adjacent mounting devices or other fixtures. The mounting device 60 also has a component surface 72 and a substrate surface 74. As their names imply, the component surface 72 is used for connection to a fluid control component, while the substrate surface 74 is used for connection to a substrate.

In sum, the mounting device 60 has a top surface or component surface 72, a bottom surface or substrate surface 74, a first end surface or serial connection surface 72, and a second end surface or serial connection surface 74. Subsets of these surfaces and other surfaces associated with the mounting device 60 are discussed below.

The first mounting plate 62 has a number of surfaces, including a first linking major surface 82. This surface is used for connection with the linking plate 66. A first component minor surface 84 forms a subset of the component surface 72. That is, the first component minor surface 84 corresponds to that portion of the component surface 72 which is associated with the first mounting plate 62. Similarly, the first mounting plate 62 has a first substrate minor surface 86. The first substrate minor surface 86 corresponds to that portion of the substrate surface 74 which is associated with the first mounting plate 62.

The first mounting plate 62 also has a first fluid port 88. In addition, the first serial connection major surface 68 of the first mounting plate 62 has a first set of through holes 90A and 90B and a first set of threaded holes 92A and 92B. As discussed below, these holes are used for connecting one modular device to another.

The first mounting plate 62 also includes first component affixation apertures 94A and 94B and first substrate affixation apertures 96A and 96B. The component affixation apertures 94A and 94B are used to attach a component to the modular mounting device 60, while the substrate affixation aperture 96A and 96B are used to attach the mounting device 60 to a substrate.

The second mounting plate 64 has a similar configuration. That is, the second mounting plate 64 has a second linking major surface 102 which is attached to the linking plate 66. A second component minor surface 104 forms a portion of the component surface 72 corresponding to the second mounting plate 64. The second substrate minor surface 106 forms a portion of the substrate surface 74 corresponding to the second mounting plate 64.

FIG. 2 illustrates a second fluid port 108 formed in the second serial connection major surface 70 of the second mounting plate 64. The second serial connection major surface 70 also illustrates second through holes 110A and 110B and second threaded holes 112A and 112B. Observe that the through holes 90A and 90B of the first mounting plate 62 are aligned with the threaded holes 112A and 112B of the second mounting plate 64. Further observe that the threaded holes 92A and 92B of the first mounting plate 62 are aligned with the through holes 110A and 100B of the second mounting plate 64.

A modular mounting device 60 is attached to another device by aligning a set of threaded holes with a set of through holes. A bolt is then passed through the apertures and secured with a nut. Observe that this configuration of through holes and threaded holes allows the modular mounting apparatus 60 to be used in a bidirectional manner with another modular mounting apparatus. In this context, bidirectional means that first fluid port 88 and second fluid port 108 may be used as either input ports or output ports.

This type of flexibility is not available with prior art devices. In the prior art, one side of a block has all threaded holes or all through holes. As a result, each block can only be attached to another block in a single manner: with threaded holes aligned with through holes. In contrast, with the present invention, there are symmetrical threaded holes and through holes on each connecting surface. Therefore, the device of the invention can be used in a variety of orientations, not a single orientation as required in the prior art.

Observe that the threaded holes 92 and 112 are positioned relatively close to their respective fluid ports 88 and 108. In the prior art, threaded holes are typically positioned near the perimeter of the object. With the present invention, the threaded holes are moved toward the center of the object where the fluid port is positioned. This allows fewer bolts to be used in creating a strong seal at the fluid ports 88 and 108. Thus, in accordance with the invention, fewer affixation devices (e.g, bolts) are required to establish a fluidic seal.

FIG. 2 also illustrates second component affixation apertures 114A and 114B which operate consistently with their counterparts 94A and 94B of the first mounting plate 62. The second mounting plate 64 also includes second substrate affixation apertures 116A and 116B. These structures operate in the same manner as the structures 96A and 96B of the first mounting plate 62.

FIG. 2 illustrates that the linking plate 66 has a first component aperture 122. The aperture 122 is used to establish fluidic communication with an attached fluid control component. A channel 124 exists between the first component aperture 122 and the first fluid port 88. FIG. 2 also illustrates a second component aperture 126. A channel 128 exists between the second component aperture 126 and the second fluid port 108.

FIG. 3 is a top view of the modular mounting apparatus 60. The figure illustrates the first component affixation apertures 94, the second component affixation aperture 114, the first component aperture 122, the second component aperture 126, the channel 124, and the channel 126. From this view it is readily appreciated that a fluid control component is positioned on the device 60 in such a manner as to establish fluid communication with the component apertures 122 and 126. A fluid may be routed through channel 124, into the attached fluid control component, and out of channel 128. FIG. 3 also demonstrates that the mounting device 60 has an "H" configuration. The void spaces in the "H" configuration allow the device to be relatively light, compared to a solid block. Also, as discussed below, the void or open spaces associated with the device allow access to a substrate, an important consideration in repair and maintenance operations.

FIG. 4 is a cross sectional view of the device 60 taken along the line 4—4 of FIG. 3. The figure illustrates the channels 124 and 128 formed in the modular mounting device 60. FIG. 4 clearly illustrates one advantage associated with the invention. Observe that the channels are formed straight into a surface. That is, the channel is normal or perpendicular to the surface at which it terminates. FIG. 2 illustrates that all other apertures associated with the device 60 have a similar configuration. In view of this fact, the device 60 is relatively easy to machine because all drilling can be done at ninety degree angles instead of relatively random angles.

FIG. 5 is an end view of the first serial connection major surface 68 of the first mounting plate 62. FIG. 6 is an end view of the second serial connection major surface 70 of the second mounting plate 64.

FIG. 7 illustrates an alternate embodiment of the invention with a single component aperture 122 and channel 124. FIG. 8 is a cross sectional view of the device of FIG. 7 taken along the line 8—8. FIG. 9 is an end view of the first serial connection major surface 68 of the device of FIG. 7 illustrating the same configuration of threaded 92 and through holes 90 as the device of FIG. 2. Similarly, FIG. 10 illustrates the second serial connection major surface 70 of the device of FIG. 7 illustrating the same configuration of through holes 110 and threaded holes 112 as the device of FIG. 2. Thus, this alternate embodiment enjoys all of the benefits of the previous embodiment, but is adapted for single port fluid control devices.

FIG. 11 is a top view of another alternate device constructed in accordance with the invention. In this embodiment, the component apertures 122 and 126 are formed in the first mounting plate 62 and second mounting plate 64, respectively. Otherwise, the device of FIG. 11 is consistent with previous embodiments.

FIG. 12 is a cross sectional view of the device of FIG. 11 taken along the line 12—12. The figure illustrates the channel 124 formed in the first mounting plate 62 and the channel 128 formed in the second mounting plate 64.

FIG. 13 is an end view of the first serial connection major surface 68 of the device of FIG. 11 illustrating the same configuration of threaded 92 and through holes 90 as the device of FIG. 2. Similarly, FIG. 14 illustrates the second serial connection major surface 70 of the device of FIG. 7 illustrating the same configuration of through holes 110 and threaded holes 112 as the device of FIG. 2.

FIG. 15 is a perspective view of a substrate mount 150 in accordance with an embodiment of the invention. A modular mounting device 60 of the invention may be affixed to a substrate mount 150. Thereafter, the substrate mount is attached to a standard substrate. This configuration allows access to individual fluid control components, without dismantling an entire gas stick. That is, individual substrate mounts 150, corresponding modular mounting devices 60, and attached fluid control components may be repaired or replaced without dismantling an entire gas stick, as will be further appreciated with the following discussion.

The substrate mount 150 includes a base surface 152 with base surface through holes 154A and 15B positioned therein. A plateau surface 156 is formed on the base surface 152. The plateau surface 156 extends beyond the base surface 152 to form a ledge region 158. The legion region 158 defines ledge region through holes 160A and 160B. Plateau valleys 162 are formed in the plateau surface 156. The plateau valleys 162 terminate in valley floors 164, which define valley floor apertures 166A and 166B.

FIG. 16 is a cross sectional view of the substrate mount 150. The figure illustrates the base surface 152, the plateau surface 156, the ledge region 158 and the valley floor 164.

FIG. 17 is a top view of the substrate mount 150, illustrating the base surface 152, the plateau surface 156, the ledge region 158 and the other components described in connection with FIG. 15.

FIG. 18 illustrates how a modular mounting device 60 may be positioned on serially linked substrate mounts 150A and 150B. First observe that a base surface 152A of a first substrate mount 150A is aligned with a ledge region 158B of a second substrate mount 150B. Further observe that a mounting device 60 straddles two substrate mounts. FIG. 18 illustrates that affixation apertures 96A and 96B are aligned with the valley floor apertures 166A and 166B and the affixation apertures 116A and 116B are aligned with the valley floor apertures on the device 150B. The "H" configuration of the mounting device 60 allows access to the bolts 180 and 182 which are used to attached adjacent substrate mounts 150A and 150B. The mounting plates 150 add torsional rigidity to improve the integrity of the connecting seals associated with the fluid control system.

FIG. 18 demonstrates that an individual mounting device 60 and its associated substrate mounts 150 can be readily accessed for servicing. Thus, unlike the prior art, an entire gas stick does not have to be removed from a substrate for servicing.

In sum, the H-shape defined by the first mounting plate, the second mounting plate, and the linking plate provides a number of advantages. First, the mounting apparatus is relatively light, compared to a solid block structure. The H-shape also allows less material to be used so the device is relatively cost effective. The arrangement of the threaded holes and through holes of the mounting plates allows for bi-directional configuration of each mounting apparatus, unlike prior art unidirection mounting blocks. The relatively close proximity of the threaded holes to one another allows seals to be established with the use of only two bolts, instead of the four perimeter bolts that are used in prior art block devices. The open shape of the mounting apparatus allows easy access to the substrate so that individual fluid control components can be replaced without dismantling an entire gas stick. Advantageously, the channels formed in the mounting apparatus are parallel or perpendicular to the surface upon which they terminate. Consequently, all machinging is done at 90 degree angles, instead of the random angles that may be required with prior art devices.

The substrate mounts of the invention provide an intermediate substrate which facilitates modular repairs of individual fluid control components and seals. In addition, the mounting plates add considerable torsional rigidity to improve the integrity of the connecting seals.

Those skilled in the art will appreciate that the devices of the invention can be used individually or in combination. Thus, the mounting device 60 does not have to be used with the substrate mount 150, rather it can be directed attached to a substrate. It should be appreciated that the modular mount 60 can be configured for any number of fluid control devices, including flow controllers, pressure gauges, pressure transducers, regulators, on-off valves, filters, and the like. The techniques of the invention can be applied to semiconductor processing equipment, hydraulic equipment, petrochemical equipment, food processing equipment, and the like.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A mounting apparatus for fluid control components, comprising:

a first mounting plate with a first serial connection major surface with a first fluid port, a first set of through holes, and a first set of threaded holes formed therein, a first linking major surface, a first component minor surface with first component affixation apertures formed therein, and a first substrate minor surface with first substrate affixation apertures formed therein;

a second mounting plate in a parallel configuration with said first mounting plate, said second mounting plate including a second serial connection major surface with a second fluid port, a second set of through holes, and a second set of threaded holes formed therein, a second linking major surface, a second component minor surface with second component affixation apertures formed therein, and a second substrate minor surface with second substrate affixation apertures formed therein; and a linking plate attached to a portion of said first linking major surface and a portion of said second major linking surface, such that said linking plate is in a perpendicular configuration with respect to said first mounting plate and said second mounting plate.

2. The mounting apparatus of claim 1 wherein said first set of through holes of said first mounting plate are aligned with said second set of threaded holes of said second mounting plate.

3. The mounting apparatus of claim 2 wherein said first set of threaded holes of said first mounting plate are aligned with said second set of through holes of said second mounting plate.

4. The mounting apparatus of claim 1 wherein said linking plate includes a linking plate component minor surface defining a first component aperture, said linking plate further defining a first channel between said first component aperture and said first fluid port.

5. The mounting apparatus of claim 4 wherein said linking plate includes a linking plate component minor surface defining a second component aperture, said linking plate further defining a second channel between said second component aperture and said second fluid port.

6. The mounting appartus of claim 1 wherein said linking plate includes a linking plate component minor surface defining a component aperture, said linking plate further defining a channel between said first fluid port, said component aperture, and said second fluid port.

7. The mounting apparatus of claim 1 wherein said first mounting plate includes a component aperture formed in said first component minor surface, said first mounting plate further defining a channel between said first fluid port and said component aperture.

8. The mounting apparatus of claim 1 wherein said second mounting plate includes a component aperture formed in said second component minor surface, said second mounting plate further defining a channel between said second fluid port and said component aperture.

9. The mounting apparatus of claim 1 in combination with a first substrate mount.

10. The mounting apparatus of claim 1 wherein said first substrate mount includes a base surface with base surface through holes defined therein, a plateau surface on top of a portion of said base surface and extending past said base surface to form a ledge region, said ledge region including ledge region through holes, said plateau including plateau valleys with valley floors with valley floor apertures positioned therein.

11. The mounting apparatus of claim 10 in combination with a second substrate mount with a second base surface aligned with said ledge region of said first substrate mount.

12. The mounting apparatus of claim 10 wherein said second substrate mount includes a second plateau surface on top of a portion of said second base surface and extending past said second base surface to form a second ledge region.

* * * * *